United States Patent [19]

Grimm, Jr.

[11] 4,046,495

[45] Sept. 6, 1977

[54] DISPENSER PUMP

[76] Inventor: Bruce F. Grimm, Jr., 119 Pine Way, Broomfield, Colo. 80020

[21] Appl. No.: 727,992

[22] Filed: Sept. 30, 1976

[51] Int. Cl.$^2$ ............................................. B67D 5/40
[52] U.S. Cl. .................................. 417/268; 417/566; 222/385
[58] Field of Search ............. 417/268, 479, 480, 489, 417/566; 222/380, 383, 385

[56] References Cited

U.S. PATENT DOCUMENTS

| | | | |
|---|---|---|---|
| 3,211,346 | 10/1965 | Meshberg | 222/380 X |
| 3,361,078 | 1/1968 | Cooprider | 222/383 X |
| 3,527,551 | 9/1970 | Kutik et al. | 417/566 |
| 3,759,426 | 9/1973 | Kane | 222/385 |

*Primary Examiner*—Carlton R. Croyle
*Assistant Examiner*—Richard E. Gluck
*Attorney, Agent, or Firm*—Van Valkenburgh and Lowe

[57] ABSTRACT

A fluid dispenser pump having a piston extending from one end of a cylinder with resilient means urging the piston from the cylinder to its extended position for manual movement into the cylinder to its retracted position, said piston and cylinder being elastomeric plastic members, with complementary cylindrical walls forming a sequence of chambers. An inlet chamber communicates with a fluid supply. An auxiliary pressure chamber is normally sealed from the inlet chamber, but it communicates with the inlet chamber whenever the piston is at its fully extended position. An operating chamber communicates with the auxiliary pressure chamber and a first check valve means between the chamber permits flow from the auxiliary pressure chamber to the working chamber, but prevents a reversal of such flow. A discharge chamber communicates with the working chamber and a second check valve means between the chambers permits flow from the working chamber to the discharge chamber but prevents a reversal of such flow. There is also an outlet from the discharge chamber. The check valve means are formed as thinwall sleeve members embracing stem portions and said sleeve members expand responsive to fluid pressure, to move away from the stem portions to permit fluid flow therepast.

8 Claims, 15 Drawing Figures

DISPENSER PUMP

The present invention relates to pump type liquid dispensers, and more particularly to pushdown dispensers which are commonly mounted in the mouths of containers. This invention is more specifically concerned with reciprocatory type pump dispensers such as exemplified by the patent to Kane, U.S. Pat. No. 3,759,426, issued Sept. 18, 1973, and is an improvement over and a development from that patent.

The Kane dispenser is essentially a pump having a cylinder body mounted in the mouth of a container with a suction intake extending downwardly from the bottom of the cylinder. The piston is a spring-lifted plunger mounted in the top of this pump with a dispensing spout at its top. A pattern of concentric chambers within this Kane pump includes an intake chamber, an intermediate operating chamber above the intake chamber and a discharge chamber about the two, connecting with the dispensing spout. In this sequence, the chambers are separated from each other by directional check valves so that the general operation is as follows: as the plunger is lifted by the spring, the operating chamber increases in volume to create a suction to pull liquid thereinto from the intake chamber and past an intake check valve. A manual downstroke of the plunger closes the intake check valve and builds up pressure within this operating chamber to move fluid past the discharge check valve and into the discharge chamber.

One unique feature of Kane resides in the fact that the check valves are integral with the pump structure and each consists of a tapered sleeve having a tip portion embracing a cylindrical wall or stem. Accordingly, the pump is necessarily made of elastomeric material and unbalanced pressure in the direction of flow will push the tip portion of a sleeve away from the wall or stem it embraces to permit a flow of liquid therepast. An unbalanced pressure in the opposite direction will push the tip against its wall or stem to prevent a backflow.

The Kane pump was found to be unsuitable for the dispensing of some types of liquids such as viscous liquids, and not always satisfactory for very small dispenser pumps where the amount of liquid to be dispensed each time the plunger was depressed was not great. One source of trouble was found to be that the intake check valve could be too stiff to open responsive to suction in the operating chamber. Instead, a vacuum would form in the operating chamber when the fluid could not get past the intake check valve.

It was suggested that this operational problem could be eliminated by providing another check valve of a more conventional type at the entrance of the intake chamber. However, it was found that this was not practical and would unduly complicate the structure of the pump. A significant advantage of the Kane structure resides in the fact that it may be manufactured as a two-piece structure by injection molding operations using comparatively simple molds. A conventional check valve at the intake entrance would complicate the molds and increase the cost of the pump. The cost increase, no matter how slight, is significant when it is recognized that a primary use for such a pump is for dispensing household liquids and for this purpose, the pump would be manufactured by the millions.

The present invention was conceived and developed with the foregoing and other considerations in view and comprises, in essence, a dispenser of the Kane type which is provided with an auxiliary pressure chamber between the intake chamber and the operating chamber, which during one cycle of operation is open and under a vacuum to receive fluid from the intake chamber, and which during another cycle of operation is closed to force fluid into the operating chamber. The valving between the intake chamber and the auxiliary chamber, if it can be called such, consists of an auxiliary stem on the piston which reaches into the tubular intake chamber from a larger chamber section thereabove. This auxiliary stem blocks and closes off the intake chamber at all positions of the piston, except at its fully extended position.

The objects of the invention are to provide a novel and improved dispenser pump which: is an exceedingly simple, structural arrangement of a minimum number of parts with the various structural and mechanical components making up a pump being integrated into these parts; may be manufactured by injection molding operations at an absolute minimum of expense, especially when large numbers of the pump are to manufactured; operates in a simple, reliable manner and is capable of pumping a fixed amount of fluid during each stroke; is capable of pumping many types of fluids including comparatively viscous fluids; can be made as a very small unit capable of dispensing small amounts of fluid with each stroke and is thus suitable for dispensing fluids such as cosmetics, hairsprays, perfumes and the like; and is a neat appearing, easily used, versatile, reliable and durable unit.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1, Sheet 1, is an isometric view of the improved pump in its retracted position showing the same mounted in the mouth of a jar and with an intake tube extending from the bottom thereof, a fragment of the jar and tube being shown in section.

FIG. 2 is a longitudinal sectional view of the pump in the retracted position, as for shipment and storage, as taken from the indicated line 2—2 at FIG. 1, but on an enlarged scale.

FIG. 3, Sheet 2, is a fragmented sectional isometric view of the cylinder of the pump, as taken from the indicated line 3—3 at FIG. 2.

Figure 1:
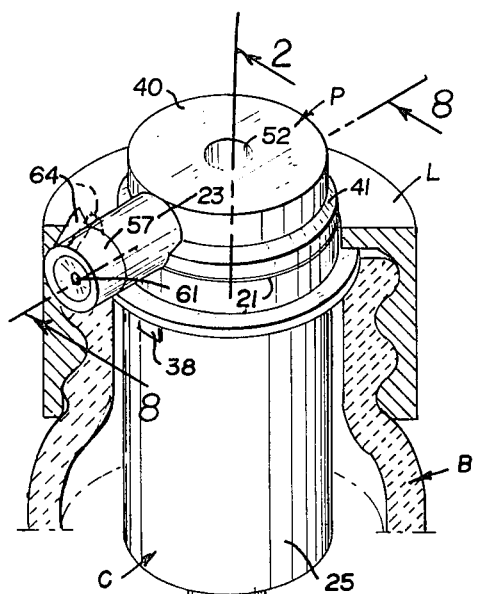
Figure 2:
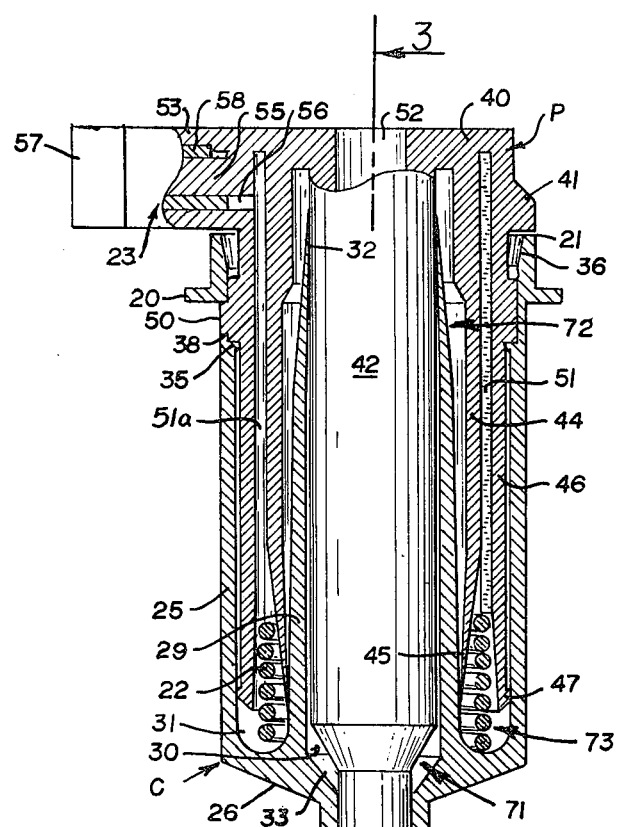
Figure 8:
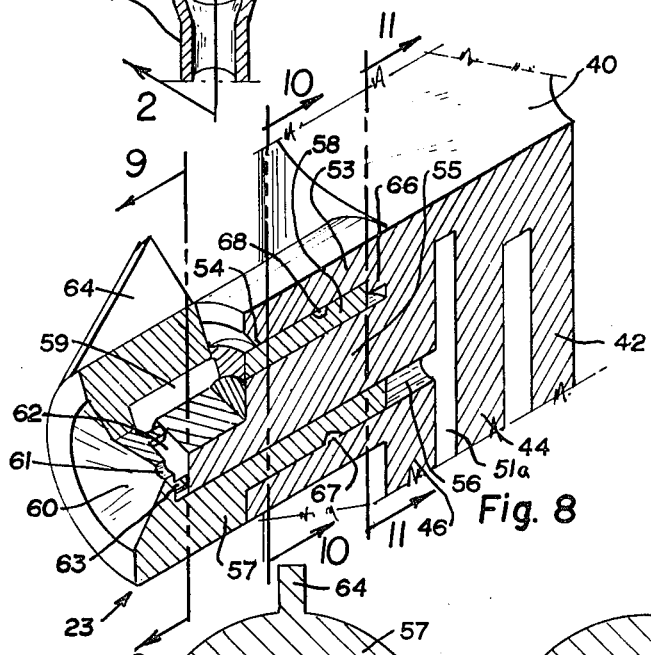
Figures 7, 12, 13, 14:
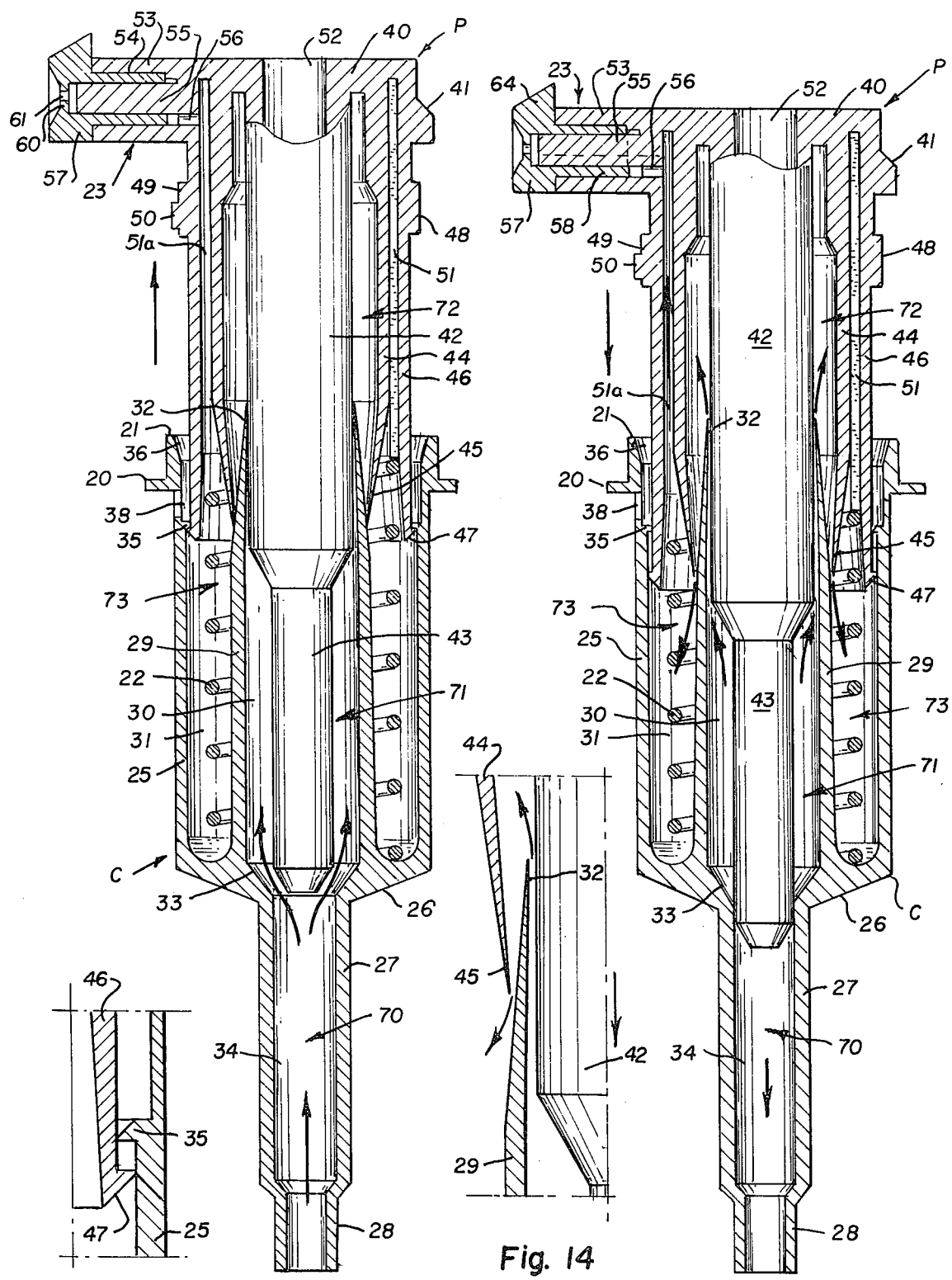

FIG. 7, Sheet 3, is a fragmentary sectional detail of a portion of the showing at FIG. 2, showing the wall portions of the piston and cylinder, but on an enlarged scale. FIG. 8, Sheet 1, is a fragmentary sectional isometric view of the discharge spout of the pump, as taken from the indicated line 8—8 at FIG. 1, but on an enlarged scale.

Figure 9:
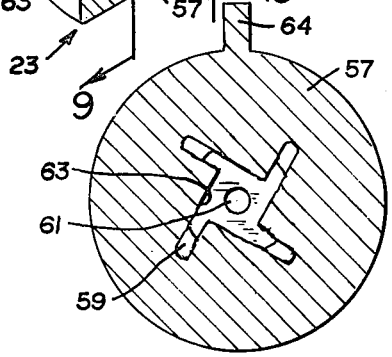
Figure 10:
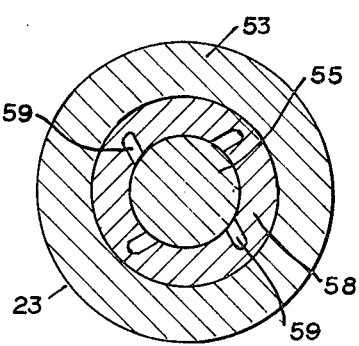
Figure 11:
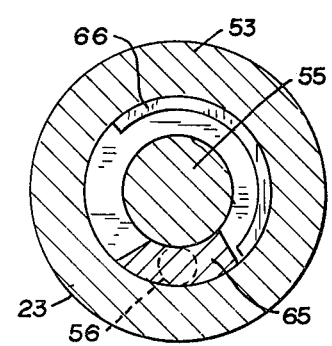

FIGS. 9, 10 and 11 are transverse sectional views of the nozzle structure as taken from the indicated lines 9—9, 10—10 and 11—11 at FIG. 8, but on a further enlarged scale.

FIG. 12, Sheet 3, is a longitudinal sectional view similar to FIG. 2, but with the plunger piston extended and with arrows indicating the movement of fluid as at the end of an intake stroke.

FIG. 13 is a longitudinal sectional view similar to FIG. 12, but with the piston plunger moved to commence the pumping stroke and with arrows indicating the movement of fluid as pumping commences.

FIG. 14 is a fragmentary sectional detail of the valve portions as shown at FIG. 12, but on an enlarged scale and with the valves open as when fluid is being pumped through them.

Figures 3, 4, 5, 6, 15:
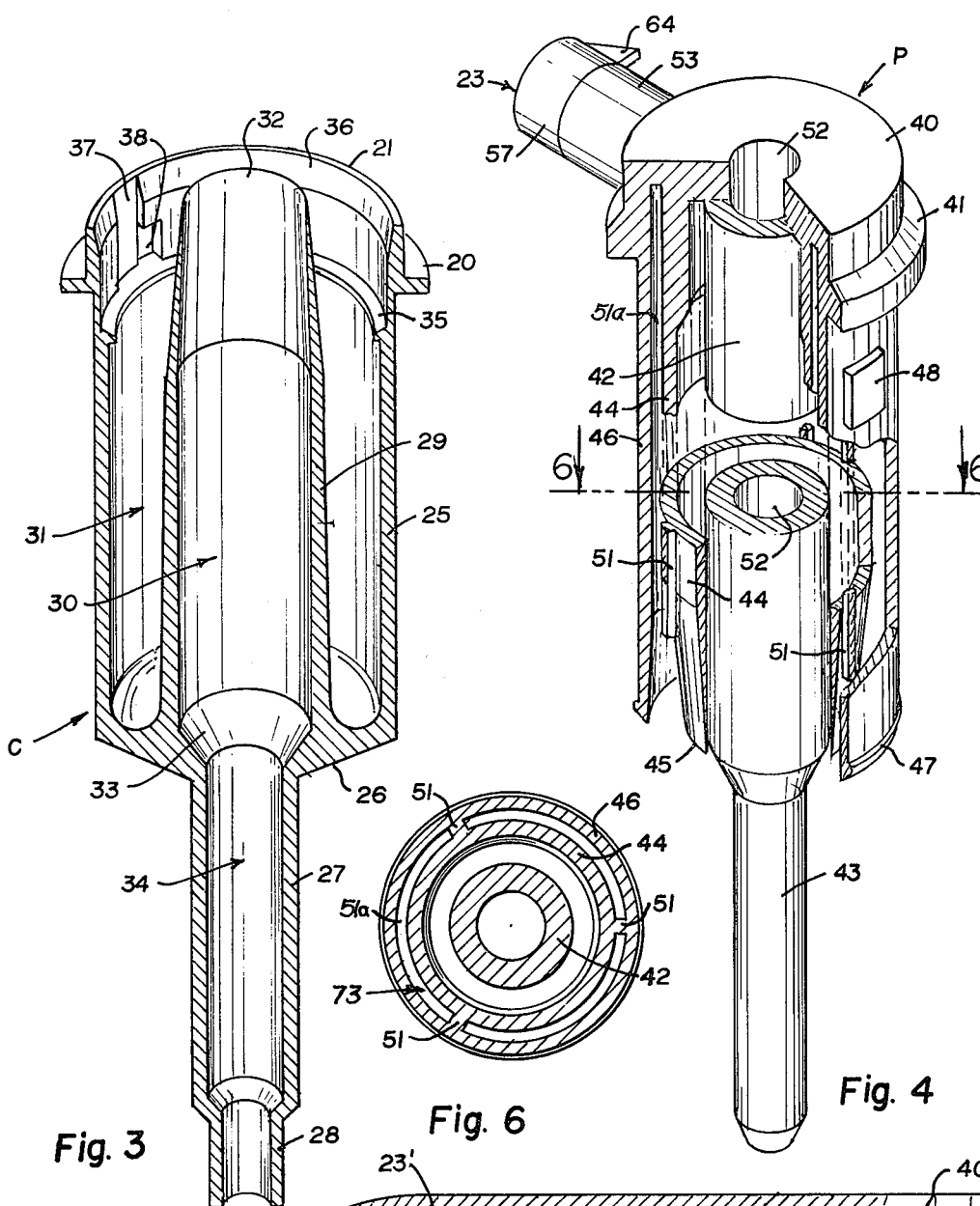
FIG. 4 is a fragmented sectional isometric view of the piston of the pump, as taken essentially from the indicated line 3—3 at FIG. 2, but with some portions being shown in full and other portions being in section.
FIG. 5 is a fragmentary isometric view of the top portion of the piston, as taken from the opposite direction to the showing at FIG. 4.
FIG. 6 is a transverse sectional view of the piston as taken from the indicated line 6—6 at FIG. 4.

FIG. 15, Sheet 2, is a fragmentary sectional detail similar to the showing of FIG. 8, but illustrating a modified arrangement of a nozzle adapted to pump a low velocity stream of fluid such as hand lotions instead of spraying.

Referring more particularly to the drawings, the improved dispenser pump is a two-component unit consisting of a cylinder C and a piston P therein. In its normal use, the pump is an upright, axially symmetrical unit with the piston above the cylinder. This pump may be very small and may be only about ½ inch in diameter and not more than 2 inches long. So proportioned, it can fit within the mouth of a bottle B as indicated at FIG. 1. To so fit, the cylinder C is provided with an outstanding circumferential mounting flange 20 near its upper rim 21 to set upon the mouth of the bottle B and to be held in place by an open-top lid L provided for the purpose as illustrated. The piston P thus sets above this rim and a compression spring 22 within the pump urges the piston upwardly. The pump is operated by pressing the piston downwardly and into the cylinder. Fluid is then ejected from the pump through a spout 23 outstanding from one side of the top portion of the piston above the cylinder.

This pump, which may be a very small unit, has its components, the cylinder and the piston, hereinafter described in detail, arranged to permit them to be formed by a simple, one shot injection molding operation at an absolute minimum cost per unit. Accordingly, the body and wall portions of the cylinder and piston are essentially concentric, axial members having minimal undercuts in an arrangement which permits them to be easily withdrawn from a mold. The spout, extending laterally from the top of the piston, may be formed with lateral mold components. To be so molded, the material forming this pump will be an elastomeric, thermoplastic resin, a preferred material being medium density polyethylene. Not only does polyethylene have the desired elastomeric qualities necessary for proper operation of the pump, but also, this material is chemically resistant to practically all substances with which the pump will be normally used, such as liquids used for cosmetic purposes. It is to be emphasized, however, that other materials, other than polyethylene, are suitable for manufacture of the pump.

The structure of the cylinder C is best illustrated at FIG. 3. The main cylindrical wall 25 includes the flange 20, heretofore mentioned, and the rim 21 at the top portion of this wall 25. The cylinder, open at the top, is closed at the bottom by a floor 26 which may be conical in form as illustrated and an intake tube 27 depends, axially, from the apex of this floor. The lower end of the intake tube 27 may be further reduced in diameter to form a nipple 28 suitable for the attachment of an extension tube T as illustrated at FIG. 1. The extension tube T will be necessary whenever the pump is mounted in an ordinary bottle having a depth greater than the length of the pump within it. The tube T will thus be of a length suitable to reach the bottom of the bottle.

The internal structure of the cylinder, best shown at FIG. 3, will include an axially upstanding sleeve 29 to divide the cylinder into two sections: a central, cylindrical section 30 and an outer, annular section 31 embracing this central section 30. The sleeve 29 forming the central section 30 terminates at its upper end, adjacent to the rim 21, as a feathered sleeve valve 32 hereinafter further described. The central section 30 terminates at its lower end as a conical funnel 33 to join the passageway 34 in the intake tube 27. The outer wall 25 of the annular section 31 of this cylinder C terminates at the top rim 21, and the bottom of the section 31 is the floor 26. The inner surface of the wall 25 includes a stop 35 near, and a short distance below, the flange 20. The purpose of this stop is to engage an opposing stop at the bottom of the piston P as will be hereinafter described. The inner surface of the wall 25 above the stop 35 is enlarged in diameter to accommodate a spacer on the piston as will be described, and the top portion of this inner surface adjacent to the rim 21 is bevelled slightly as at 36 to facilitate guiding the piston into position during assembly of the pump. The outer wall of the cylinder above the flange 20 is also enlarged in diameter to compensate for the inner-wall enlargement.

To complete this cylinder, a bayonet slot 37 is formed at the inner surface of wall 25 above the stop 35 to extend from the rim 21 to the stop 35. The offset of the bayonet slot 37 is below the flange 20 and above the stop 35 and opens through the wall to form a vent 38. This opening 38 will receive a locking boss on the piston when the pump is at its retracted position, as will be described. This is advantageous when the pump is assembled to a filled container and stored or shipped prior to use. Also, whenever a user is through with the pump and wants to put it away for storage, he can lock the piston in the retracted position. When the pump is in use, the vent 38 will permit air to enter the bottle whereon the pump is mounted as fluid is pumped from the bottle.

The components forming the piston are complementary to the cylinder structure. An upper head 40 of the piston, a flat circular member, carries these components and also the spout 23. This head structure may include a shoulder 41 whose outer diameter will correspond with the outer diameter of the cylinder adjacent to the rim 21 to provide a neat appearing unit, especially when the pump is at its retracted position.

An axial stem 42 depends from this head to reach into the central section 30 of sleeve 29. Its diameter is somewhat less than the internal diameter of the sleeve 29 to permit fluid to flow between this stem 42 and the sleeve 29. The length of the stem 42 is such as to reach the bottom portion of the central section 30 when the piston is retracted. An auxiliary stem 43 of reduced diameter extends axially from the stem 42 to fit into the passageway 34 of the intake spout 27. The fit of the auxiliary stem in this intake passageway 34 is a snug, sliding fit to prevent the flow of liquid through the passageway whenever it is closed by the auxiliary stem. The length of this auxiliary stem 43 is such as to reach essentially to the bottom of the intake spout when the piston is retracted, but to move above the funnel portion at the entrance of the intake spout passageway 34 when the piston is at its fully extended position, as best illustrated at FIG. 12.

An intermediate sleeve 44, concentric with the stem, depends from this head 40 with its lower end being feathered to form a sleeve valve 45. The internal diameter of this stem is such as to fit about the cylinder sleeve 29 with an annular cavity between these members, but with the sleeve valve 45 engaging the outer wall of the opposing cylinder sleeve 29 as hereinafter further described.

The outer wall 46 of this piston P also depends from the head 40 and is concentric with the stem 42 and sleeve 44. Its outer diameter is such as to engage the inner edge of the stop 35 of the cylinder wall 25. A circular, outwardly-flared stop 47 at the lower rim of this piston wall 46 engages the inner surface of the cylinder wall 25 to function as a fluid seal. It also functions as a stop to limit the normal upward movement of the piston when the cylinder stop 35 is engaged. The undersurface of this stop is bevelled as illustrated to permit the piston to be pushed into the cylinder past the cylinder stop 35 for assembly, such being possible because the material from which the cylinder and piston is manufactured will be quite flexible and can stretch somewhat. The upper portion of this piston wall 46 includes a pair of diametrically opposing bosses 48 and 49. The location and proportions of these bosses is such as to permit them to fit into the upper portion of the cylinder above the stop 35. Also, the boss 49, illustrated as being directly underneath the spout 23, includes an upraised portion, a locking boss 50 which fits into the bayonet slot 37 and into the vent 38. Thus, when the piston is fully retracted and rotated to place the locking boss 50 in the vent 38, the unit is at its retracted, locked, leak-proof position, as best illustrated at FIG. 2.

A triad of splines 51, paralleling the axis of the piston, is fitted in the annular space between the sleeve 44 and the wall section 46 to serve the double function of rigidifying the piston structure and to provide abutments, at their lower ends, to hold the spring 22. These splines 51 are arranged so that they are spaced away from alignment with the spout so that one space 51a between the sleeve 44 and wall 46 and between the two adjacent splines 51 forms the single fluid passageway to the spout. To complete this piston unit, a central axial hole 52 may be formed in the head 40 to extend into the stem 42; however, this hole is to increase molding efficiency and to provide a socket which may sometimes be used for advertising devices.

The spout 23 may be formed to provide a spray, a jet or a slow flow of liquid. One type of spout, suitable for spray action, is illustrated at FIGS. 1 – 14 and in detail, at FIGS. 8 – 11. This spout is formed as a cylindrical spout body 53 outstanding from the piston head 40. An annular socket 54 extends into the body 53 with the core forming a stub 55 outstanding a short distance beyond the body. A passageway 56 extends from the annular space between the sleeve 44 and wall 46 of the piston and into the socket 54.

A nozzle body 57, a short, cylindrical member, has the same diameter as the spout body 53 and a tubular end 58 which snugly fits into the socket 54 with the nozzle body 57 abutting against the end of the body 53. An array of spline-like passageways 59 is formed at the inner side of the tubular end 58 and in part of the nozzle body to permit fluid to flow therethrough about the core 55 and to the end of the nozzle body 57. The end of the nozzle is formed as a transverse wall 60 with a discharge orifice 61 at its center. A small chamber 62 is formed between the inside of the wall 60 and the end of the stub 55 and the passageways 59 communicate with this chamber 62 to provide flow to the orifice. To obtain a spray, this flow must be swirled or rotated as it enters the orifice 61. Guide walls 63 outstand from the inner side of the wall 60 in a tangential array about the orifice 61 to bring about the desired spray action.

The discharge spout opens and closes by rotation of the nozzle body 57, and a finger tab 64 outstands from the side of the nozzle body for this purpose. The drawing indicates the finger tab 64 as being at an inclined position with respect to the pump axis when the nozzle is shut off and being upright when the nozzle is turned on; however, such is optional. The length of the tubular end 58, fitted into the socket 54, is such as to be a short distance from the base of the socket 54 to permit a flow of fluid through passageway 56 and directly to the passageways 59 when the nozzle is open. To shut off this flow through the nozzle, an extension of sector 65 extends beyond the tubular end 58 to reach the bottom of the socket 54 and to overlie the passageway 56, FIG. 11, when the nozzle is at the closed position. Whenever this extension is moved away from the passageway 56, by rotating the nozzle, fluid may then flow through the nozzle. A narrow annular segment 66 is provided at the base of the socket 54 to limit the rotative movement of the sector 65 as best shown at FIG. 11.

The four components thus described, the cylinder C, the piston P, the spring 22 and the nozzle end 57, constitute the entire pump structure and these components may be formed by simple injection molding operations. To assemble the pump the spring is dropped into the outer annular section 31 of the cylinder to rest upon the floor portion 26. The piston is completed by pushing the tubular end 58 of the nozzle into the spout socket 54. The piston is next fitted into the cylinder by pressing against the spring, with the spring abutting against the ends of the splines 51 and with pressure sufficient to push the piston stop 47 past the cylinder stop 35, a resilient plastic material forming these members permitting an expansion of the cylinders sufficient to accomplish this. To complete this assembly, the piston is forced to its fully retracted position with the lock boss 50 moving into the bayonet slot 37 and with the piston being rotated slightly to move the lock boss into the vent 38. The pump thus assembled is then ready for shipment. It is to be noted that the tubular end 58 of the nozzle 57 is fitted into the spout 23 with a slight interference fit and ordinarily, this is sufficient to hold the nozzle in place against fluid pressure encountered when the pump is being used. If, however, it is necessary, a bead 67 may be formed in the spout socket 54 to fit into a circumferential slot 68 in the tubular end 58 to provide a positive engagement of the nozzle end 58 into the socket 54, as at FIG. 8.

The operation of the pump is effected through release of the lock boss 50 from the bayonet slot 37 and upon such release, the piston will be urged to its upward extended position by the spring, as at the position shown at FIG. 12. This operation may best be explained by referring to a sequence of chambers within the pump through which the liquid passes. The intake tube 27 forms the intake chamber 70. The space within the embrace of the central cylinder sleeve 29 forms the auxiliary pressure chamber 71. The annular space between the main stem 42 of the piston and the sleeve about this stem forms the operating chamber 72. The annular space between the cylinder sleeve 29 and the outer wall 25 of the cylinder and between the piston sleeve 44 and the outer wall 46 of the piston forms the discharge chamber 73 with the discharge passageway from this chamber being at the passageway 56 to the spout 23.

The auxiliary stem 43 of the piston fills the intake chamber 70 whenever the pump is at its retracted position as illustrated at FIG. 2. When the lock boss 50 is released, the spring urges the piston upwardly and the volume of the chambers 71, 72 and 73 increases. It is to be noted that the spring 22 is designed to have a strength sufficient to push this piston upwardly, even against a complete vacuum in these chambers. The auxiliary pressure chamber 71 and the operating chamber 72 are necessarily under a vacuum. A vacuum is not formed in the discharge chamber 73 because air will be sucked into the chamber through the orifice 61. It is to be noted that this reverse airflow, such as it may be, is very desirable to purge the orifice of liquid with each stroke of the pump and avoid the possibility of a plugging-up and/or dripping action. If such is not desired, a small check valve can be provided in the spout.

This movement of the piston with the chambers 71 and 72 being under a vacuum will continue until the auxiliary stem 43 is lifted out of the intake passageway 34 of the tube 27 as in the manner illustrated at FIG. 12. This upward movement of the stem 43 in the intake chamber 70 will pull liquid into the chamber 70 and as soon as the stem is lifted out of the chamber, the vacuum formed in the auxiliary pressure chamber 71 will pull liquid from the intake chamber 70 and into the chamber 71 until the vacuum in that chamber is completely broken. The vacuum in the operating chamber 72 may not be sufficient to pull liquid past the valve 32 which embraces the piston stem 43, but this is of no consequence.

As the downstroke of the piston commences, the auxiliary stem 43 moves downwardly and into the intake chamber 70. As soon as it moves into this chamber, the passageway 34, it cuts off a reverse flow from the auxiliary pressure chamber 71 and to the intake chamber 70, as illustrated at FIG. 13. A continued downward movement of the piston then places the liquid within this auxiliary chamber 71 under pressure and the liquid being incompressible must escape past the sleeve valve 32 and into the operating chamber 72 as indicated by the arrows at FIG. 13. Movement of liquid past this sleeve valve 32 will eventually fill the operating chamber 72 to the point where the operating chamber is also under pressure and continued movement of liquid into that chamber forces liquid past the discharge sleeve valve 45, all as in the direction of the indicated arrows at FIG. 13. After two or three strokes, the discharge chamber is substantially filled with liquid and continued downward movement of the piston towards its retracted position will force liquid upwardly, through the passageway 56 and from the spout 23. It is to be noted that the feathered sleeve valves 32 and 45 are forced to expand responsive to the positive pressures applied against them and in so doing, they function as effective check valves permitting flow in one direction only. The closing off of the intake chamber 70 by the auxiliary stem 33 as its downward movement commences, during the downstroke of the piston, and the forming of a vacuum in the auxiliary chamber 71 during an upstroke of the piston are the keys to the desired pressure actions to assure pumping. Although normal pump design does not permit vacuums to form, in the present instance, with the arrangement of components described, the operation proves to be very effective.

FIG. 15 illustrates a modified form of a spout 23'. This spout is formed as a simple tubular passageway 75 outstanding from the head 40' of the piston with a suitable downcurved portion 76 at its exit. A small orifice 56' may be formed at the bottom of this passageway and the annular discharge chamber 73, formed by the cylindrical wall 46 of the piston and the adjacent sleeve 44 within the piston. It is to be noted that the size of the orifice may be varied as desired. Other spouts can also be used.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. A fluid dispenser pump having a piston extending from one end of a cylinder with resilient means urging the piston from the cylinder to its extended position for manual movement into the cylinder to its retracted position, said piston and cylinder being elastomeric plastic members with complementary cylindrical walls forming a sequence of chambers, which include:
   a. an inlet chamber to communicate with a fluid supply;
   b. an auxiliary pressure chamber normally sealed from the inlet chamber but communicating with the inlet chamber whenever the piston is at its fully extended position;
   c. an operating chamber communicating with the auxiliary pressure chamber and a first check valve means between the operating and auxiliary pressure chambers which permits flow from the auxiliary pressure chamber to the operating chamber but prevents a reversal of such flow;
   d. a discharge chamber communicating with the operating chamber and a second check valve means between the discharge and operating chambers which permits flow from the operating chamber to the discharge chamber but prevents a reversal of such flow; and
   e. an outlet from the discharge chamber; wherein
   f. said auxiliary pressure chamber and said operating chamber increase in volume when the piston is being extended and decrease in volume when the piston is being retracted whereby reciprocation of the piston into the cylinder pumps fluid past the check valve means and through the pump; and
   g. said check valve means are formed as thinwall sleeve members embracing stem portions, said sleeve members expanding responsive to fluid pressure, to move away from the stem portions to permit fluid flow therepast.

2. The dispenser defined in claim 1, wherein:
   a. said piston includes an auxiliary stem which lies within the auxiliary pressure chamber when the piston is extended;
   b. the inlet chamber adjacent to the auxiliary pressure chamber slidably receives the auxiliary stem with a substantially fluid-tight fit, and said stem is adapted to move into the inlet chamber as the piston commences to retract into the cylinder to cut off communication between the inlet and auxiliary pressure chambers to normally seal the auxiliary pressure chamber from the inlet chamber and to force fluid from the auxiliary pressure chamber, past the said first check valve means and into the operating chamber.

3. The dispenser defined in claim 1, wherein the complementary cylindrical walls of the cylinder and piston include:
   a. a central axial stem depending from the piston and a smaller auxiliary stem extending therefrom;
   b. a cylindrical axial wall within the cylinder to receive said central axial stem and define said auxiliary—pressure chamber;
   c. a tubular extension from the cylinder having a cylindrical intake passageway connecting with the auxiliary pressure chamber to define said intake passageway; wherein said auxiliary stem lies in the auxiliary pressure chamber when the piston is fully extended from the cylinder but moves into the intake passageway as the piston commences to retract into the cylinder with the auxiliary stem being proportioned to provide a sliding, fluid-tight fit in the intake passageway.

4. The dispenser defined in claim 3, wherein:
said central axial stem fits in said cylindrical wall with a loose fit to permit flow between the two; and
said first check valve means is at the end of the cylindrical axial wall and comprises a slightly converging portion, feathered to a thin edge and reduced in diameter to normally embrace and grip said stem but to flex away from the stem responsive to pressure in the auxiliary pressure chamber.

5. The dispenser defined in claim 4, wherein:
an axial wall on the piston embraces the aforesaid cylindrical axial wall with the space between the two and said central axial stem constituting said operating chamber; and
said second check valve means at the extended end of the cylindrical axial wall of the piston comprises a slightly converging portion, feathered to a thin edge and reduced in diameter to normally embrace and grip said cylindrical axial wall but to flex away from the wall responsive to pressure in the operating chamber.

6. The dispenser defined in claim 5, wherein:
said piston is formed with an outer wall embracing, but being spaced from, the aforesaid axial wall on the piston; and
said cylinder includes an outer wall embracing the outer wall of the piston with the space between these outer walls and the adjacent inward walls of the piston and cylinder forming said discharge chamber; and
a spout means at the upper end of the piston having a passageway communicating with said discharge chamber.

7. A fluid dispenser pump of resilient plastic material and of the type which includes an uprightly oriented cylinder having the top open and the bottom closed by a floor adapted to be mounted in the mouth of a container, a piston extending from the top of the cylinder to reciprocate therein and a spring means urging the piston to an extended position from the cylinder for manual operation of the same by depressing the piston to a retracted position within the cylinder, wherein the cylinder includes:
   a. an intake tube depending from the floor of the cylinder;
   b. a cylindrical sleeve within the cylinder upstanding from the floor of the cylinder to define a central section and an outer annular section with the passageway from the intake tube communicating with the central section, with the diameter of the central section being greater than the diameter of the intake tube, and the piston includes:
   c. a head section at the top thereof;
   d. a stem depending from the head section and being fittable within the cylindrical sleeve with a clearance fit to permit fluid to move between the stem and cylinder sleeve;
   e. an auxiliary stem depending from the stem and fittable into said intake tube with a fluid tight fit;
   f. a piston sleeve depending from the head section to fit over the cylindrical sleeve with a clearance fit to permit fluid to move between the cylindrical sleeve and piston sleeve, and wherein:
   g. the upper end of said cylindrical sleeve is feathered and tapered inwardly to embrace and engage said stem to form a resilient check valve; and
   h. the lower end of said piston sleeve is feathered and tapered inwardly to embrace and engage the outer wall of said cylindrical sleeve to form a resilient check valve.

8. The pump defined in claim 7, wherein:
a piston wall depends from the head section about and spaced from said piston sleeve; and
a cylinder wall upstands from the floor to lie about the piston wall with a fluid tight fit.

* * * * *